(12) United States Patent
Chun et al.

(10) Patent No.: US 8,837,424 B2
(45) Date of Patent: Sep. 16, 2014

(54) MOBILE COMMUNICATION SYSTEM AND METHOD FOR PROCESSING HANDOVER PROCEDURE THEREOF

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 995 days.

(21) Appl. No.: 12/364,878

(22) Filed: Feb. 3, 2009

(65) Prior Publication Data

US 2009/0201881 A1   Aug. 13, 2009

Related U.S. Application Data

(60) Provisional application No. 61/026,119, filed on Feb. 4, 2008.

(30) Foreign Application Priority Data

Feb. 2, 2009   (KR) .................. 10-2009-0008159

(51) Int. Cl.
*H04W 4/00* (2009.01)
*H04W 36/02* (2009.01)
*H04J 11/00* (2006.01)
*H04W 36/08* (2009.01)
*H04W 36/06* (2009.01)

(52) U.S. Cl.
CPC .............. *H04W 36/02* (2013.01); *H04W 36/08* (2013.01); *H04W 36/06* (2013.01); *H04J 11/0069* (2013.01)

USPC .......................................... 370/331; 455/436

(58) Field of Classification Search
USPC ..................... 370/331–334; 455/436–444
See application file for complete search history.

(56) References Cited

U.S. PATENT DOCUMENTS

| | | | |
|---|---|---|---|
| 7,181,218 B2 | 2/2007 | Ovesjo et al. | |
| 2008/0108354 A1* | 5/2008 | Nagata | 455/438 |
| 2008/0318578 A1* | 12/2008 | Worrall | 455/437 |
| 2009/0086676 A1* | 4/2009 | Meylan et al. | 370/331 |
| 2009/0196252 A1* | 8/2009 | Fischer | 370/331 |
| 2009/0209259 A1* | 8/2009 | Brusilovsky et al. | 455/438 |
| 2010/0093355 A1* | 4/2010 | Voyer et al. | 455/436 |
| 2010/0189071 A1* | 7/2010 | Kitazoe | 370/331 |
| 2011/0134886 A1* | 6/2011 | Kim et al. | 370/331 |

FOREIGN PATENT DOCUMENTS

| | | |
|---|---|---|
| CN | 1819702 A | 8/2006 |
| KR | 100612703 B1 | 8/2006 |
| WO | WO-2007/052922 A1 | 5/2007 |
| WO | WO-2007/078051 A2 | 7/2007 |
| WO | WO-2007/108655 A2 | 9/2007 |

* cited by examiner

*Primary Examiner* — Thai Hoang
(74) *Attorney, Agent, or Firm* — Birch, Stewart, Kolasch & Birch, LLP

(57) ABSTRACT

A method for processing a handover procedure in a mobile communication system is disclosed. After a type of handover is recognized based on information included in a handover command, a radio resource reconfiguration operation is selectively performed or a data transmission start point is adjusted, to thereby minimize an unnecessary operation occurring in the handover process and optimize a data transmission between a user equipment and a base station.

14 Claims, 5 Drawing Sheets

MOBILE COMMUNICATION SYSTEM AND METHOD FOR PROCESSING HANDOVER PROCEDURE THEREOF

The present application claims the priority benefits of U.S. Provisional Application No. 61/026,119 filed on Feb. 4, 2008 and Korean Patent Application No. 10-2009-0008159 filed on Feb. 2, 2009 in Republic of Korea. The entire contents of these applications are herein fully incorporated by reference.

TECHNICAL FIELD

The present invention relates to a long term evolution (LTE) system and, more particularly, to a mobile communication system for differently performing radio resource reconfiguration according to types of handover, and a method for processing a handover procedure thereof.

BACKGROUND ART

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

A random access channel (RACH) will now be described. The RACH is used to transmit data with a relatively short length to uplink, and in particular, the RACH is used when a UE, which has not been allocated dedicated radio resources, has a signaling message or user data to be transmitted to uplink. Or, the RACH may be also used for a base station to instruct a UE to perform a RACH procedure.

The mobile communication system is different from a fixed line communication system in that the mobile communication system should provide a seamless service to UEs with mobility. Namely, the mobile communication system features that it supports the case where a UE moves to a different area. When the UE becomes away from a connected base station and simultaneously becomes close to a different base station, a network should perform an operation of changing a connection point of the UE to the new base station from the serving base station. While the UE is disconnected from the old base station and completes its connection to the new base station, there is no data transmission or reception.

Meanwhile, every user data has a transmission limit time. For example, in case of a voice call, single voice information generated from a device intending transmission of the voice information should be transmitted to a device that is to receive the voice information within a certain time. In addition, data such as TCP ( ) should be delivered from a sender to a recipient within a certain time, and the reception side should inform the sender about acknowledgement of transmission/reception of the TCP data within a certain time, otherwise the sender would re-transmit the TCP data.

In general, the UE and the base station continuously exchange transmission/reception acknowledgement information with respect to the transmitted/received data. For example, in case of a TCP packet, if a single packet is lost by lower entities while being transmitted from the sender to the recipient, the transmission side TCP entity rapidly lowers a transmission rate (speed) of the TCP data. For example, the transmission side TCP entity, which generates data and transmits the same to the reception side at a rate of 100 Mbit/s, determines that the reception side has failed to receive even only one packet, the transmission side TCP entity rapidly lowers the transmission rate of the TCP data to, for example, 10 Kbit/s.

Thus, in the mobile communication system, in order to reduce an influence on the TCP, a lossless mode to effectively support traffic such as the TCP between the base station and the UE. The lossless mode may be considered an AM (Acknowledge Mode) RLC, and if the transmission side fails to receive a reception acknowledgement response with respect to its transmitted data from the reception side within a certain time or if the transmission side receives information of a reception failure with respect to its transmitted data, the transmission side re-transmits the data.

In this case, however, when the transmission side receives the information of reception failure with respect to certain data, it does not always perform retransmission with respect to the corresponding data but performs retransmission only when a transmission/reception acknowledgement response is made within a maximum transmission delay time defined in a radio interface.

FIG. 4 is a signal flow chart illustrating a handover procedure between the UE and the base station defined in the LTE.

As shown in FIG. 4, the UE performs measurement on the strength or the like of signals with respect to each cell, and if a particular reference (base) designated by the base station is satisfied according to the measurement results, the UE transmits a measurement report message to a source base station (source eNB) via uplink (UL) (S10).

The source eNB determines performing of handover to move the UE to a cell of a target eNB with reference to the measurement report message received from the UE, and transmits context data to the target eNB to request preparation of handover (S20).

The target eNB secures radio resources under its management, and transfers radio resource configuration information together with a temporary identifier (new C-RNTI) with respect to the corresponding UE to the source eNB. The source eNB transmits a handover command to the UE (S40) and then starts transmission of user data (PDCP SDU) or the like to the target eNB. In this case, the source eNB transmits data (PDOP SOUs) which have been successively received from the UE to a core network (MME/UPE), and transfers first one (PDCP SDU) of data which have not been successively received from the UE, to the target eNB. Also, the source eNB delivers data which have not been acknowledged by the UE, among the data (PDCP SDUs) the source eNB had transmitted to the UE.

Upon receiving the handover command, the UE reestablishes a radio environment with the target eNB including timing synchronization (S50). The target eNB response to the UE by timing information, and the UE transmits a handover confirmation message to the target eNB (S60). In this case, the target eNB transmits reception acknowledgement information with respect to the handover confirmation message to the UE. Additionally, the target eNB may transmit user data transmission/reception confirmation information (PDCP status report) to the UE. The PDCP status report informs about which user data (PDCP SDUs) have been successfully received by the source eNB from the UE and about which user data (PDCP SDUs) have not been successfully received. In other words, the PDCP status report may be interpreted as information of user data the target eNB requests its retransmission from the UE.

Upon receiving the PDCP status report, the UE retransmits data informed to have not been successfully received by the source eNB among the data attempted to have been transmitted to the eNB, and does not retransmit data informed to have been successfully received by the eNB.

Thereafter, when the handover is completed, the target eNB informs the source eNB about the success of handover (S70), and transmits user data to the core network (MME/UPE) to update the location of the UE. At this time, with respect to the user data which had been attempted to be transmitted by the UE when the UE located within the source eNB, the target eNB performs realigning on the user data received from the source eNB and the data received from the UE located within the target eNB, and transfers successfully restored user data to the MME/UPE.

In the related handover procedure, as soon as the UE is connected to the new target eNB, the UE starts transmission to the target eNB, starting from the first user data which had not been acknowledged by the source eNB, among the user data the UE had transmitted to the source eNB in step S60. Namely, the UE does not start user data transmission to uplink after it receives the user data transmission/reception confirmation information from the target as soon as the UE is connected to the new target eNB, but starts transmission to the uplink at the same time when the handover occurs. Such user data transmission causes a first problem as follows.

FIG. 5 shows an example of an unnecessary data transmission occurring in the handover procedure between the UE and the base station.

With reference to FIG. 5, the transmission side PDCP entity of the UE starts transmission of six user data (PDCP SDU 1 to PDCP SDU 6) to the transmission side RLC at a time T0, and the transmission RLC entity transmits user data by using RLC PDU 1 to RLC PDU 6. In this case, only RLC PDU 1, among the six RLC PDUs, is acknowledged by the reception side RLC, while the RLC PDU 2 to RLC PDU 6 have been received by the reception side RLC but their status report has not been transmitted yet. The received RLC PDU 1 to RLC PDU 6 are delivered to an upper layer at the reception side.

When handover occurs at the time T1, the transmission side and reception side RLC entities are all reset, and the transmission side PDCP entity transmits all the PDCP SDUs (PDCP SDU 2 to PDCP SDU 6) starting from the PDCP SDU 2, and the transmission side RLC entity transmits the user data by using RLC PDU A to RLC PDU G. At this time, the reception side PDCP entity transmits a PDCP status report to the transmission side PDCP entity.

At a time T2, namely, when the PDCP status report has not been received yet, the transmission side RLC entity exchanges the RLC PDUs with a peer entity (i.e., the reception side RLC entity).

Thereafter, when the PDCP status report arrives at the transmission side PDCP entity at a time T3, the transmission side PDCP entity confirms that the PDCP SDU 1 to PDCP SDU 6 are all received by the reception side, deletes the PDCP SDU 2 to PDCP SDU 6, and transmits discard indication information with respect to the discarded PDCP SDUs or the like to the RLC entity.

In this manner, although the source eNB successfully receives the PDCP SDU 1 to PDCP SDU 6 at the time T0 to T1, unless an acknowledgement of the PDCP SDU 2 to PDCP SDU 6 is transferred to the UE, the UE starts transmission of the PDCP SDU 2 to PDCP SDU 6 in the new cell. In this case, because the UE starts transmission of the PDCP SDUs before it receives the transmission/reception acknowledgement response from the target eNB, the unnecessary transmission is generated. In addition, the unnecessary retransmission of the data delays transmission of new data, negatively affecting the quality of service (QoS) of the system.

SUMMARY OF THE INVENTION

The handover operations in the related art are performed by the terms of the source base station and the target base station, which, however, is always performed regardless of the types of handover. Namely, it occurs although the source base station and the target base station are the same.

In case where the source base station and the target base station are different, such operations may be considered to be optimum because data transmission should be necessarily performed, but when the source base station and the target base station are the same, the above-mentioned operations include many unnecessary factors.

For example, when the source base station and the target base station are the same, there is no need to forward data, namely, there is no need to transfer the user data from one base station to another base station. In addition, when the source base station and the target base station are the same, the same RLC entity and PDCP entity can be used before and after handover.

Nonetheless, the current handover operation does not discriminate handover in the same base station and handover between different base stations.

Therefore, in order to address the above matters, the various features described herein have been conceived. One aspect of the exemplary embodiments is to provide a mobile communication system and a method for processing a handover procedure, capable of optimizing data transmission between a UE and a base station by minimizing an unnecessary operation in the handover process This specification provides a method for processing a handover procedure of a mobile communication system, including: receiving a radio resource reconfiguration message from a base station; recognizing a handover type based on information included in the received radio resource reconfiguration message; and performing a first or second handover procedure according to the recognized handover type.

The radio resource reconfiguration message may be a handover command.

The information may include a C-RNT, a handover type indicator, a physical cell identity (PCI), and a reconfiguration indicator. The reconfiguration indicator may include a reconfiguration indicator of an RLC entity and that of a PDCP entity.

The first handover procedure may indicate a procedure for handover between different base stations (intra Node B HO), and the second handover procedure may indicate a procedure for handover in the same base station (inter Node B HO).

The method may further include: if a transmission/reception acknowledgement information operation indicator is included in the information, starting data transmission after receiving transmission/reception acknowledgement information. The transmission/reception acknowledgement information may be a PDCP status PDU.

This specification also provides a mobile communication system including: a base station that transmits a radio resource reconfiguration message; and a user equipment (mobile terminal) that recognizes a handover type based on information included in a received radio resource reconfiguration message and performs a first or second handover procedure according to the recognized handover type.

The radio resource reconfiguration message may be a handover command.

The information may include a C-RNT, a handover type indicator, a physical cell identity (PCI), and a reconfiguration indicator. The reconfiguration indicator may include a reconfiguration indicator of an RLC entity and that of a PDCP entity.

The first handover procedure may indicate a procedure for handover between different base stations (intra Node B HO), and the second handover procedure may indicate a procedure for handover in the same base station (inter Node B HO).

The UE may perform the first or second handover procedure based on whether or not a new C-RNTI exists in the radio resource reconfiguration message.

The UE may perform the first or second handover procedure based on whether or not a handover type indicator exists in the radio resource reconfiguration message.

The UE may perform the first or second handover procedure based on whether or not a new PCI exists in the radio resource reconfiguration message.

If a transmission/reception acknowledgement information operation indicator is included in the information, the UE may start data transmission after receiving transmission/reception acknowledgement information. The transmission/reception acknowledgement information may be a PDCP status PDU.

The embodiments of the present invention, the data transmission start point is adjusted according to the information included in the handover command and the radio resource reconfiguration operation is performed according to the type of handover, to thus minimize an unnecessary operation occurring in the handover process and optimizing a data transmission between the UE and the base station.

DETAILED DESCRIPTION OF THE INVENTION

Figure 1:
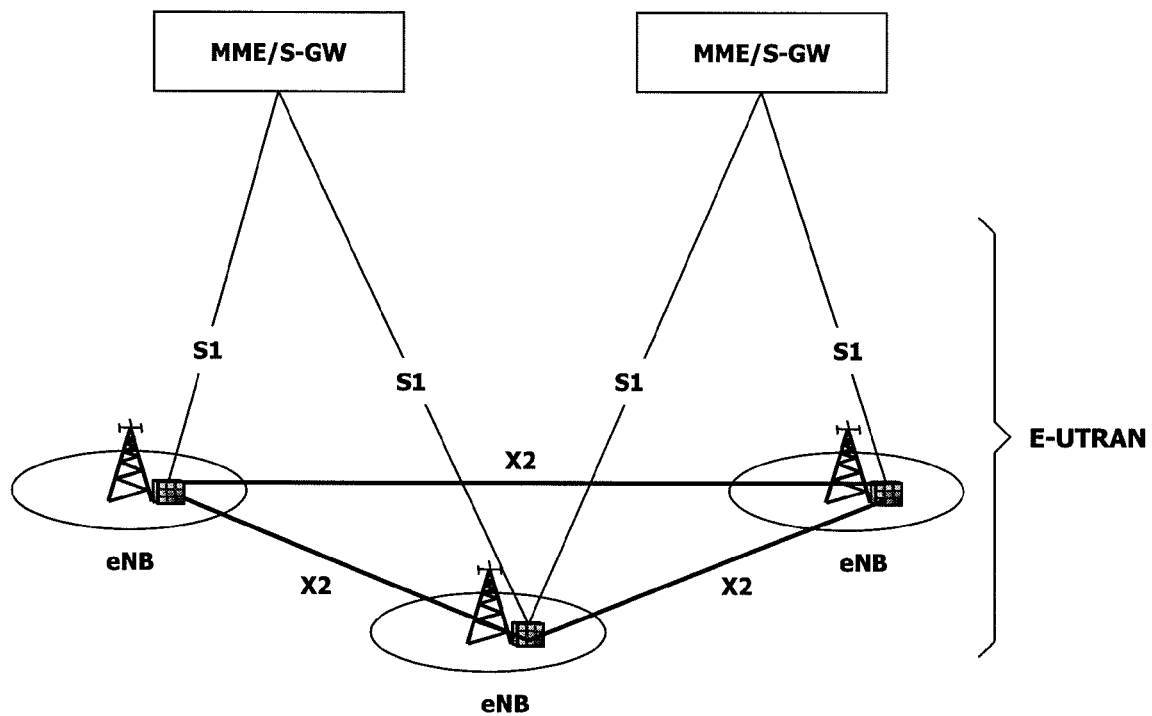
FIG. 1 shows a network structure of the E-UMTS, a mobile communication system, applicable to the related art and the present invention.
Figure 2:
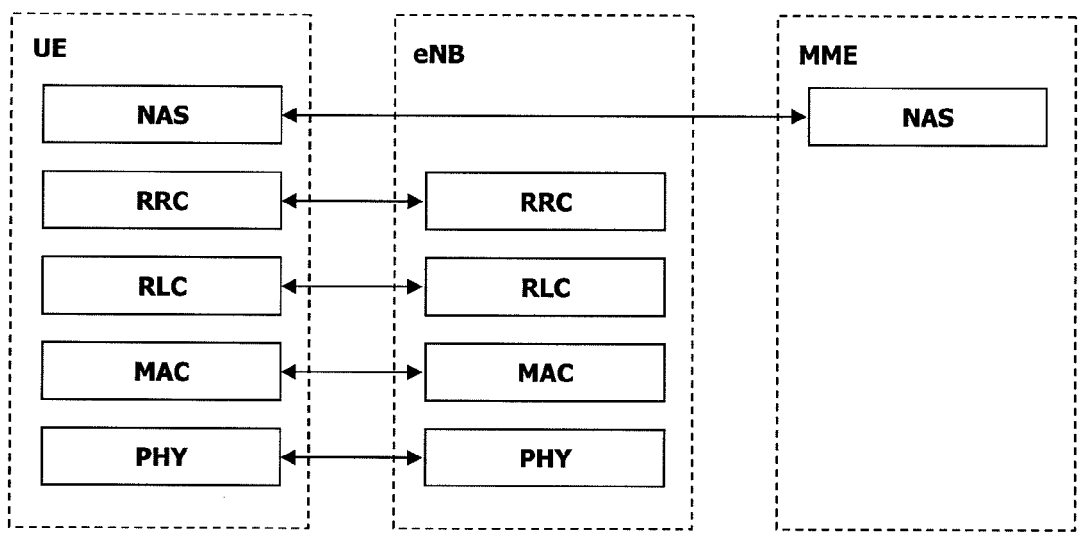
FIG. 2 shows the layers of a control plane of a radio interface protocol.
Figure 3:
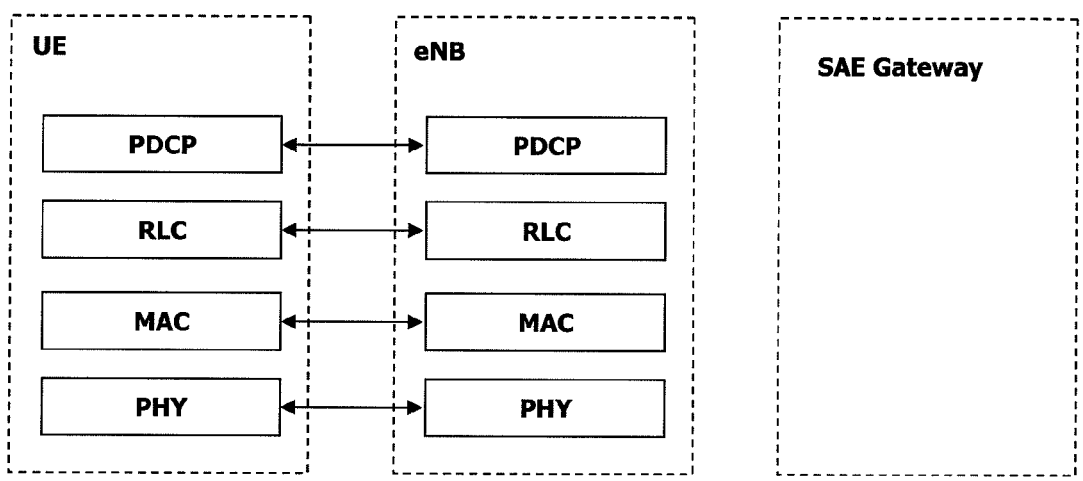
FIG. 3 shows the layers of a user plane of the radio interface protocol.
Figure 4:
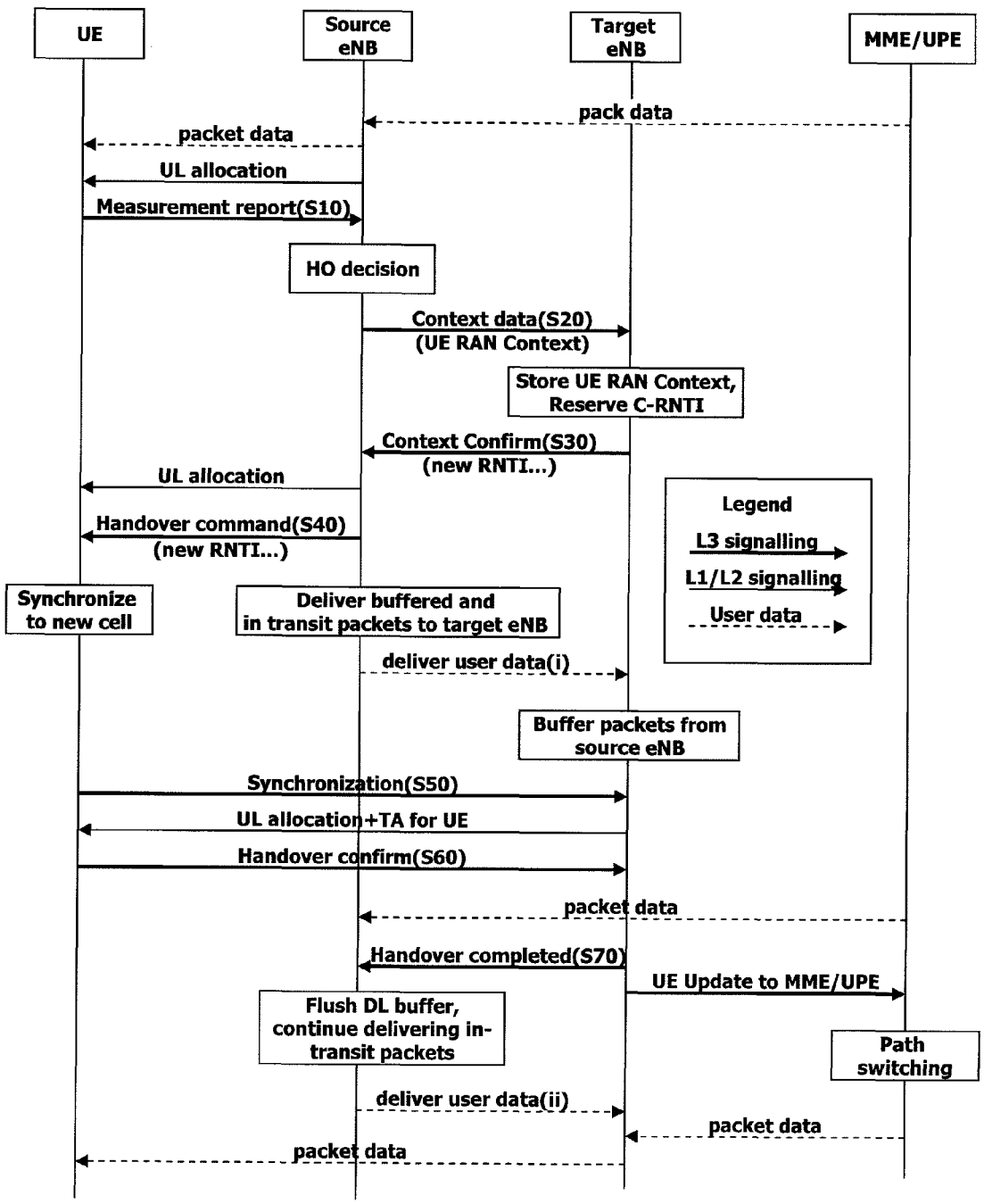
FIG. 4 is a signal flow chart illustrating a handover procedure between a UE and a base station defined in the related art LTE.
Figure 5:
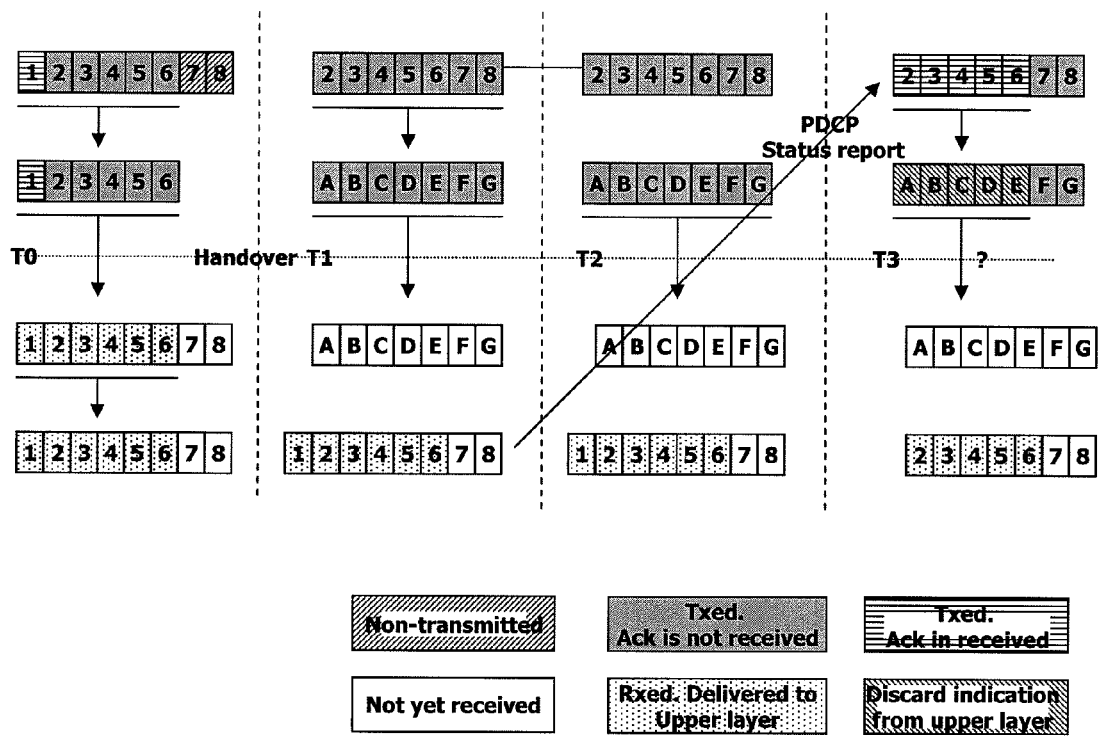
FIG. 5 shows an example of an unnecessary data transmission occurring in the handover procedure between the UE and the base station according to the related art.

The present invention is implemented in a mobile communication system such as an LTE. However, without being limited thereto, the present invention can be also applicable to any communication system operating according to different standards. The exemplary embodiments of the present invention will now be described in detail.

The present invention proposes that if a user equipment (UE) and a base station are set to transmit/receiver transmission/reception acknowledgement information to each other in a handover procedure, each entity starts data transmission after receiving the transmission/reception acknowledgement information.

Namely, when the UE receives a handover command from a source base station, it performs connection to a target base station according to the corresponding handover command, transmits a handover complete message to the target base station, and waits reception of the transmission/reception acknowledgement information from the target base station. When the transmission/reception acknowledgement information is received, the UE recognizes a list of data to be retransmitted according to content of the transmission/reception acknowledgement information, and starts data transmission.

The transmission/reception acknowledgement information is a PDCP status PDU.

The data to be retransmitted by the UE is a PDCP SDU.

The data to be retransmitted by the UE is a PDCP PDU.

Preferably, the handover command received from the source base station informs about an operation to be performed by the terminal in the target base station.

Namely, the handover command includes a transmission/reception acknowledgement information operation indicator, and the transmission/reception acknowledgement information operation indicator indicates whether the UE should start data transmission to the target base station after receiving the transmission/reception acknowledgement information or whether the UE should immediately start data transmission regardless of whether or not the transmission/reception acknowledgement information is received. Thus, when the transmission/reception acknowledgement information operation indicator indicates, the UE waits for data transmission until it receives the transmission/reception acknowledgement information from the target base station, and when the transmission/reception acknowledgement information operation indicator does not indicate, the UE starts data transmission immediately when its connection to the target base station is completed.

The transmission/reception acknowledgement information operation indicator is informed by the target base station to the source base station, and the source base station transmits it to the UE.

Preferably the transmission/reception acknowledgement information operation indicator indicates whether or not the target base station should transmit the transmission/reception acknowledgement information to the UE.

As described above with respect to the above related art, when the UE is connected to the target base station according to a handover process, it starts data transmission immediately when the handover process is successfully performed. At this time, the UE transmits the other remaining data than the data acknowledged for its reception, among data the UE has transmitted, while remaining at the source base station, to the target base station. And, when the UE additionally receives transmission/reception acknowledgement information from the target base station, the UE transmits only data notified to have not been received in the transmission/reception acknowledgement information. The UE does not transmit data which has been successfully received by the base station in the transmission/reception acknowledgement information, any more.

Preferably, while the UE is transmitted in the target base station, if the UE receives transmission/reception acknowledgement information from the base station with respect to the corresponding data, in particular, if the transmission/reception acknowledgement information indicates that the data has been successfully received, the UE does not transmit the data any more. In particular, if a portion of the data has been already transmitted to the base station, the UE performs a process of removing the corresponding data.

For example, it is assumed that the UE transmits the PDCP SDUs 1, 2 and 3 to the source base station and receives acknowledgement of only the PDCP SDU 1 from the source station, and handover occurs afterwards.

In this case, immediately when the UE is connected to the target base station, it starts transmission of the PDCP SDU 2 and the PDCP SDU 3. The PDCP SDUs are delivered via the RLC entity. If the transmission/reception acknowledgement information is received indicating that the PDCP SDU 2 has been properly received while the RLC entity transmits the PDCP SDUs, the PDCP entity of the UE determines not to transmit the PDCP SDU 2 any more and instructs the RLC entity to delete the PDCP SDU 2 or not to transmit the PDCP SDU 2 any more. Then, the RLC entity of the UE configures control information and transmits it to the RLC entity of the base station to inform that transmission of the RLC PDU or the RLC SDU with respect to the PDCP SDU 2 has been stopped or does not occur any longer.

The present invention proposes that the UE perform a proper operation according to a type of handover.

To this end, the base station transmits a radio resource reconfiguration message to the UE, and the UE discriminates a first handover or a second handover based on mobility-related information included in the radio resource reconfiguration message, and performs the discriminated handover procedure.

Preferably, the radio resource reconfiguration message indicates a handover command.

Preferably, the first handover indicates handover between different base stations (intra Node B HO), and the second handover indicates a handover within the same base station (inter Node B HO).

Preferably, the mobility-related information includes a C-RNT, a handover type indicator, a physical cell ID (PCI), and a reconfiguration indicator. The reconfiguration indicator includes a reconfiguration indicator of the RLC entity or a reconfiguration indicator of the PDCP entity.

Figure 6:
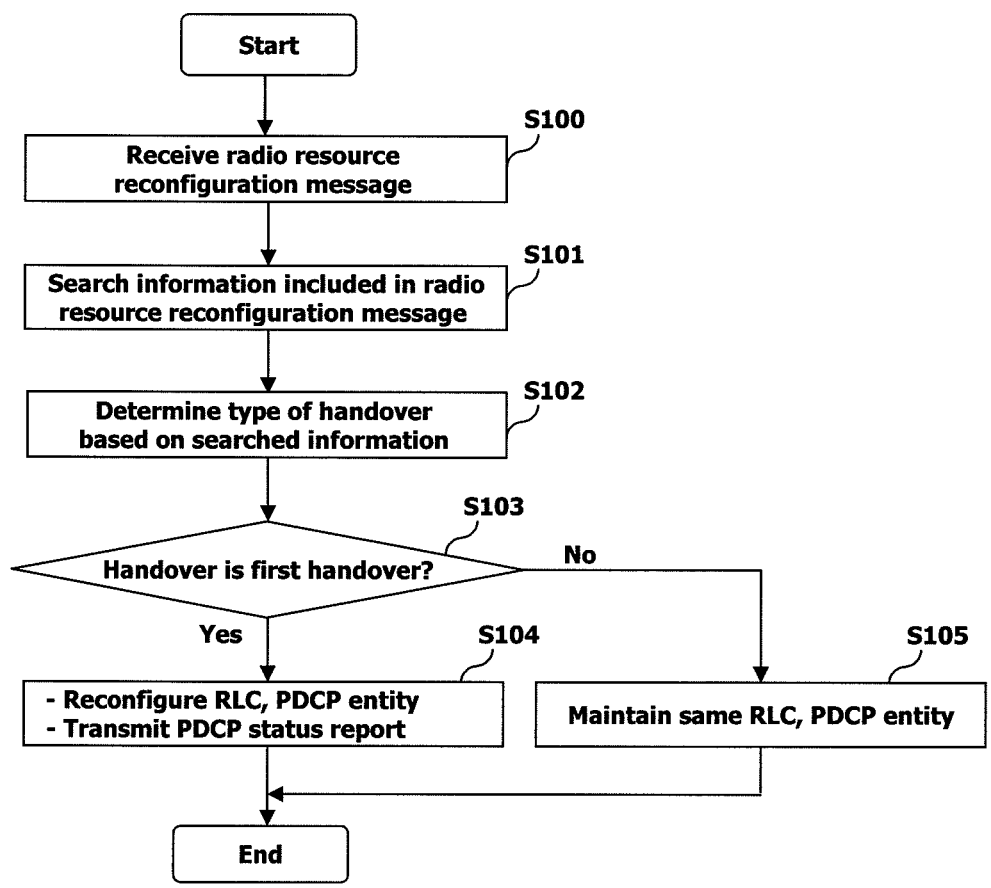
FIG. 6 is a flow chart illustrating a method for processing a handover procedure in a mobile communication system according to an exemplary embodiment of the present invention.

FIG. 6 is a flow chart illustrating a method for processing a handover procedure in a mobile communication system according to an exemplary embodiment of the present invention.

As shown in FIG. 6, when a radio resource reconfiguration message (e.g., handover command) is received from the base station (S100), the UE searches information (e.g., mobility-related information) included in the radio resource reconfiguration message (S101).

The UE recognizes a type of handover, namely, whether or not the currently performed handover is first or second handover, based on the searched information (S102, S103).

For example, if the radio resource reconfiguration message includes a C-RNTI and the corresponding C-RNTI is a new C-RNTI different from that used in a source cell, the UE regards the handover as first handover.

If the radio resource reconfiguration message includes a handover type indicator, the UE recognizes first or second handover according to whether or not the corresponding handover type indicator indicates the intra Node B HO or the inter Node B HO.

If the radio resource reconfiguration message includes the PCI and the corresponding PCI is a new PCI different from that used in the source cell, the UE recognizes the handover as the first handover.

Finally, if the radio resource reconfiguration message includes the reconfiguration indicator, the UE recognizes the handover as the first handover, or otherwise, the UE recognizes the handover as the second handover. The reconfiguration indicator is that of the RLC entity or the PDCP entity.

Accordingly, when the type of the handover is discriminated, the UE different performs radio resource reconfiguration operation according to the first handover or the second handover.

Namely, when the information included in the radio resource reconfiguration message indicates the first handover, the UE reconfigures the PDCP entity and the RLC entity when entering a new cell (S104). In particular, when the PDCP entity is reconfigured, the UE transmits the PDCP status PDU.

If the mobility-related information included in the radio resource reconfiguration message indicates the second handover, the UE does not reconfigure the PDCP entity and the RLC entity when entering the new cell (S105). Namely, the UE uses the same RLC entity and the same PDCP entity before and after the handover, and the status information of the RLC and the PDCP are maintained.

The radio resource reconfiguration message, namely, the handover command, transmitted by the base station to the UE may include information (RLC reconfiguration indicator or PDCP reconfiguration indicator) indicating whether the UE should reconfigure the RLC entity or the PDCP entity. Thus, only when the reconfiguration indicator of the RLC entity indicates reconfiguration, the UE reconfigures the RLC entity, and only when the reconfiguration indicator of the PDCP entity indicates reconfiguration, the UE reconfigures the PDCP entity.

As so far described, according to the embodiments of the present invention, the data transmission start point is adjusted according to the information included in the handover command and the radio resource reconfiguration operation is performed according to the type of handover, to thus minimize an unnecessary operation occurring in the handover process and optimizing a data transmission between the UE and the base station.

Meanwhile, the method according to the present invention, as described so far, can be implemented by hardware or software, or any combination thereof. For example, the method according to the present invention may be stored in a storage medium (e.g., an internal memory of a mobile terminal, a flash memory, a hard disc, etc.). Alternatively, the method according to the present invention can be implemented as codes or command words within a software program capable of being executed by a processor (e.g., a microprocessor in a mobile terminal).

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A method for processing a handover procedure by a user equipment (UE) of a mobile communication system, the method comprising:
receiving, by the UE, a radio resource reconfiguration message from a base station;
recognizing, by the UE, a handover type based on information included in the received radio resource reconfiguration message,
wherein the information is mobility related information,
wherein the mobility related information includes each of a first parameter indicating a target physical cell identity and a second parameter indicating a new user equipment (UE) identity, and
wherein the first parameter is a physical cell identity (PCI) and the second parameter is a cell-radio network temporary identifier (C-RNTI); and
performing, by the UE, a first or second handover procedure according to the recognized handover type,
wherein the first or second handover procedure is performed based on whether a new C-RNTI or a new PCI exists in the radio resource reconfiguration message.

2. The method of claim 1, wherein the radio resource reconfiguration message is a handover command.

3. The method of claim 1, wherein the information further comprises a handover type indicator.

4. The method of claim 1, wherein the first handover procedure indicates a procedure for handover between different base stations.

5. The method of claim 1, wherein the second handover procedure indicates a procedure for handover in the same base station.

6. The method of claim 1, further comprising:
if a transmission/reception acknowledgement information operation indicator is included in the information, starting data transmission after receiving transmission/reception acknowledgement information.

7. The method of claim 6, wherein the transmission/reception acknowledgement information is a packet data convergence protocol (PDCP) status protocol data unit (PDU).

8. A mobile communication system, comprising:
a base station configured to transmit a radio resource reconfiguration message; and
a user equipment (UE) configured to
receive the radio resource reconfiguration message,
recognize a handover type based on information included in the received radio resource reconfiguration message, and
perform a first or second handover procedure according to the recognized handover type,
wherein the information is mobility related information,
wherein the mobility related information includes each of a first parameter indicating a target physical cell identity and a second parameter indicating a new user equipment (UE) identity,
wherein the first parameter is a physical cell identity (PCI) and the second parameter is a cell-radio network temporary identifier (C-RNTI), and
wherein the UE performs the first or second handover procedure based on whether a new C-RNTI or a new PCI exists in the radio resource reconfiguration message.

9. The system of claim 8, wherein the radio resource reconfiguration message is a handover command.

10. The system of claim 8, wherein the information further comprises a handover type indicator.

11. The system of claim 8, wherein the first handover procedure indicates a procedure for handover between different base stations, and the second handover procedure indicates a procedure for handover within the same base station.

12. The system of claim 8, wherein if a transmission/reception acknowledgement information operation indicator is included in the information, the UE starts data transmission after receiving transmission/reception acknowledgement information.

13. The system of claim 12, wherein the transmission/reception acknowledgement information comprises a packet data convergence protocol (PDCP) status protocol data unit (PDU).

14. A user equipment configured to operate in a mobile communication system, the user equipment comprising:
a processor configured to
receive a radio resource reconfiguration message from a base station,
recognize a handover type based on information included in the received radio resource reconfiguration message, and
perform a first or second handover procedure according to the recognized handover type,
wherein the information is mobility related information,
wherein the mobility related information includes each of a first parameter indicating a target physical cell identity and a second parameter indicating a new user equipment (UE) identity,
wherein the first parameter is a physical cell identity (PCI) and the second parameter is a cell-radio network temporary identifier (C-RNTI), and
wherein the first or second handover procedure is performed based on whether a new C-RNTI or a new PCI exists in the radio resource reconfiguration message.

* * * * *